US012749047B2

(12) United States Patent
Scheibelhut et al.

(10) Patent No.: US 12,749,047 B2
(45) Date of Patent: Sep. 29, 2026

(54) AUTOMATED IDENTIFICATION OF ITEMS PLACED IN A CART AND ROUTING BASED ON SAME

(71) Applicant: Maplebear Inc., San Francisco, CA (US)

(72) Inventors: Brent Scheibelhut, Toronto (CA); Naval Shah, Toronto (CA); Mark Oberemk, Toronto (CA); Madeline Mesard, New York, NY (US); Akshay Bagai, Toronto (CA)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/630,679

(22) Filed: Apr. 9, 2024

(65) Prior Publication Data

US 2025/0315787 A1 Oct. 9, 2025

(51) Int. Cl.
*G06Q 10/0875* (2023.01)

(52) U.S. Cl.
CPC ................................ *G06Q 10/0875* (2013.01)

(58) Field of Classification Search
CPC .................................................. G06Q 10/0875
See application file for complete search history.

(56) References Cited

U.S. PATENT DOCUMENTS 10,088,331 B1 * 10/2018 Yeh .................... G06Q 30/0641
2009/0077841 A1 * 3/2009 Ngo ...................... G09F 15/005 40/1
2010/0030619 A1 * 2/2010 Ofer ................... G06Q 30/0605 705/26.1
2019/0318417 A1 * 10/2019 Gumaru ............. G06Q 30/0635
2020/0357040 A1 * 11/2020 Patel .................. G06Q 30/0639
2021/0032029 A1 * 2/2021 Rasmussen .......... G06Q 10/087
2021/0155409 A1 5/2021 Haid
2022/0122031 A1 * 4/2022 Powers ...................... B65B 5/12
2022/0306387 A1 * 9/2022 Roth ....................... G06Q 30/06
2023/0394432 A1 * 12/2023 Stanley ................ G06Q 10/087
2024/0054449 A1 * 2/2024 Gao ........................ G06V 20/52
2025/0139686 A1 * 5/2025 Scheibelhut ....... G06Q 30/0641

OTHER PUBLICATIONS

Chuang, Yi-Fei, Shui-Hui Chia, and Jehn-Yih Wong. "Enhancing order-picking efficiency through data mining and assignment approaches." WSEAS Transactions on Business and Economics 11.1 (2014): 52-64. (Year: 2014).*

PCT International Search Report and Written Opinion, PCT Application No. PCT/US2025/013446, Mar. 28, 2025, 12 pages.

* cited by examiner

*Primary Examiner* — Nathan A Mitchell
(74) *Attorney, Agent, or Firm* — Fenwick & West LLP

(57) ABSTRACT

A smart shopping cart may utilize cameras to identify fulfillment instructions to maximize efficiency. A fulfillment user may be tasked to fulfill a batch of orders at a retailer location. Each order includes one or more items to be obtained. The cart captures image data via one or more cameras in view of the cart's baskets. From the image data, the cart can detect obtained items placed in the baskets and can generate an occupancy state of the baskets indicating a configuration of each obtained item in the baskets. The cart can apply a fulfillment optimization model to the occupancy state to identify a next item to be obtained in the batch of orders and an optimal packing configuration for the next item. The cart can display to the fulfillment user the next item and the optimal packing configuration.

20 Claims, 8 Drawing Sheets

Fulfillment Instructions
600

AUTOMATED IDENTIFICATION OF ITEMS PLACED IN A CART AND ROUTING BASED ON SAME

BACKGROUND

Smart shopping carts are currently being developed, which are implemented with technology to aid users during their shopping trips. However, there remains a need for improvements to these smart shopping carts in understanding the layout of a cart's contents and using such information to inform the cart's operations and recommendations. For example, if a shopping cart is full, large and/or heavy items would be unobtainable, and recommending such ineligible items would likely be dismissed.

Other challenges may arise when optimizing fulfillment efficiency of orders by a fulfillment user. Lack of understanding of item layout in the cart and/or capacity of the cart can lead to non-optimal packing configurations, increasing order fulfillment latency. Optimization would aid in speeding up order fulfillment, improving fulfillment accuracy, and reducing unnecessary delay in organizing orders in a batch.

SUMMARY

In accordance with one or more aspects of the disclosure, a smart shopping cart implements one or more sensor devices to identify real-time capacity of the cart and a packing configuration of items in the cart. The smart shopping cart may include one or more cameras and one or more load sensors positioned to capture information on items placed in the baskets of the cart. The cameras can capture image data of the items in the cart. The load sensors can measure load data indicating a total load of items in the cart. Based on the image data and the load data, the cart can detect the items that were obtained, determine an occupancy state of the items in the cart's baskets, and determine remaining capacity of the cart.

In some embodiments, the cart can utilize the remaining capacity to recommend one or more items to the user. In such embodiments, a capacity-informed prediction model determines the recommended items based on the obtained items and the remaining capacity in the cart. The capacity-informed prediction model may further input other contextual data, e.g., user preference data, characteristics of the user, positioning of the cart and the items, historical order data of other users, to determine the recommended items. The capacity-informed prediction model may further determine one or more promotions to offer in conjunction with the recommended items. The cart displays these recommended items and, optionally the promotions to the user.

In some embodiments, the cart can utilize a fulfillment optimization model to determine fulfillment instructions to optimize fulfillment efficiency. The fulfillment optimization model may input the occupancy state of detected items in the cart to determine an optimal packing configuration for a next item to obtain in a batch of orders. The optimal packing configuration may include a particular position and a particular orientation of the next item, which is informed by known dimensionality of the next item. The optimal packing configuration may, also or alternatively, include an identification of a container to place the next item in, e.g., in the context of a fulfillment user fulfilling a batch of orders. The fulfillment optimization model may further determine the next item to obtain, e.g., based on positioning of the cart in relation to positions of the remaining items to obtain for the batch of orders, traffic flow in the retailer location, dimensionality of the items, remaining capacity, or some combination thereof. The fulfillment optimization model may also determine navigation instructions for the next item, e.g., to guide the fulfillment user to the next obtain. The cart displays the fulfillment instructions to the user to provide assistance to the user in fulfilling the batch of orders.

DETAILED DESCRIPTION

Online Concierge System Environment

Figure 1A:
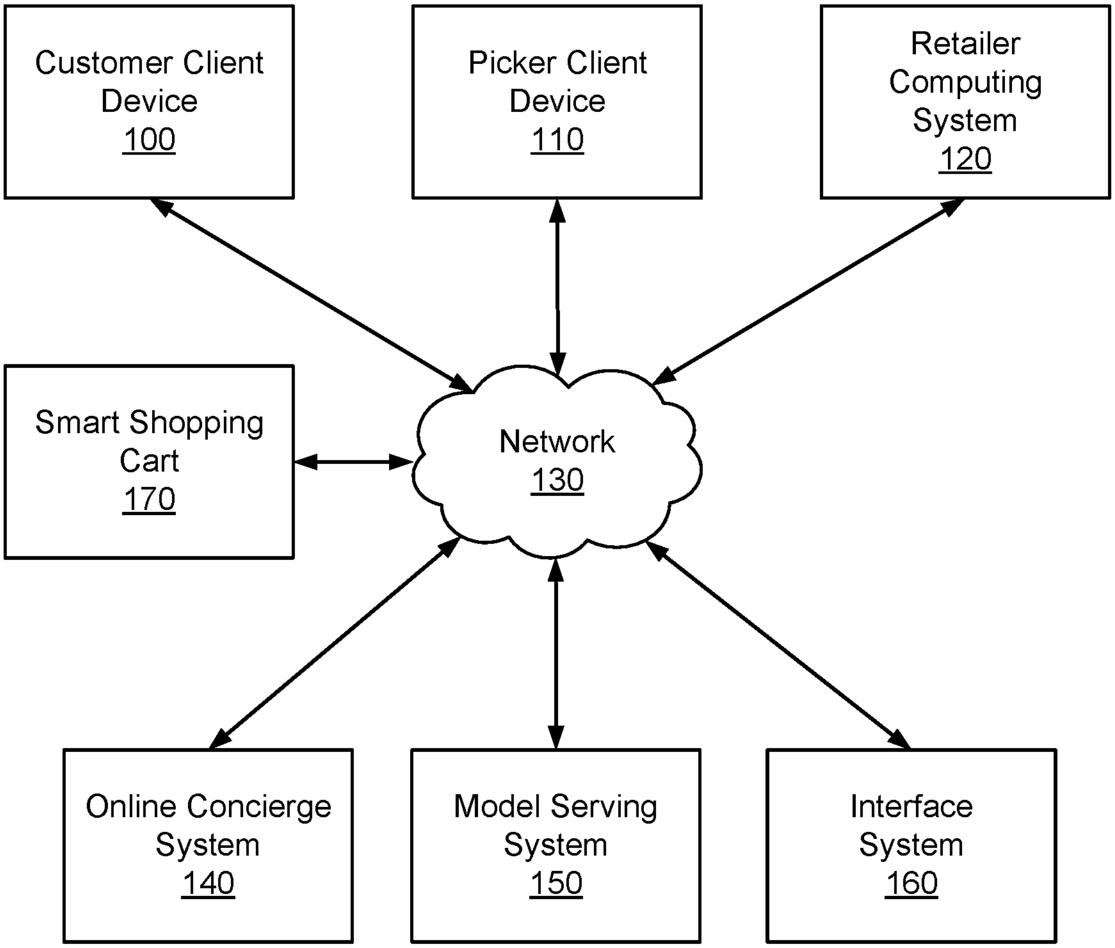
FIG. 1A illustrates an example system environment for an online concierge system, in accordance with one or more embodiments.

FIG. 1A illustrates an example system environment for an online concierge system 140, in accordance with one or more embodiments. The system environment illustrated in FIG. 1A includes a customer client device 100, a picker client device 110, a retailer computing system 120, a network 130, an online concierge system 140, a model serving system 150, an interface system 160, and a smart shopping cart 170. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, retailer computing system 120, smart shopping cart 170 are illustrated in FIG. 1, any number of customers, pickers, retailers, smart shopping carts may interact with the online concierge system 140. As such, there may be more than one customer client device 100, picker client device 110, retailer computing system 120, or smart shopping carts 170.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. A customer may also be referred to as a requesting user that provides orders to the online concierge system 140 for fulfillment. An order specifies a set of items to be delivered to the customer. An "item", as used herein, means a good, a product, or a service that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140. To perform a search, the customer provides a query (e.g., a text query, an audio query, or a visual query) to the online concierge system 140. The online concierge system 140 processes the query to return query results to the customer. Based on the displayed results, the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected. The user interface may also include options to provide input for user preferences. For example, the customer may, via the user interface, provide input tagging one or more items as favorite items. In another example, the customer may, via the user interface, provide input (e.g., in the form of user feedback or user messages) to past orders.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker may also be referred to as a fulfillment user that fulfills orders by the requesting user. Items in the order may be presented in a particular sequence (i.e., display order) to optimize efficiency of the picker. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

The picker client device 110 may also provide a communication interface to the picker, e.g., to communicate with another user of the online concierge system 140. For example, the communication interface of the picker client device 110 may present messages from a customer client device 100 to the picker client device 110. Such communication may be utilized when items in an order are unavailable at the retailer location. In such scenarios, the picker may query the customer for suitable substitution items to be obtained for the unavailable item. The messages may be in the form of text, audio, pictures, other digital manners of communicating information, etc.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The retailer computing system 120 may provide the online concierge system 140 with retailer data describing the retailer associated with the retailer computing system 120. The retailer data may include retailer name, retailer address, retailer website, retailer phone number, other identifying information, a type of retailer, an expense class of the retailer (e.g., $, $$, or $$$), opening hours, general dependability of items, diversity of items, types of items carried, or information describing the retailer, or some combination thereof. The online concierge system 140 may further infer additional retailer data based on interactions between customers or shoppers and the retailer. For example, such retailer data based on the interactions may include customer reviews, shopper reviews, popular items ordered, dependability of items, etc.

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140.

The model serving system 150 receives requests from the online concierge system 140 to perform tasks using machine-learned models. The tasks include, but are not limited to, natural language processing (NLP) tasks, audio processing tasks, image processing tasks, video processing tasks, and the like. In one or more embodiments, the machine-learned models deployed by the model serving system 150 are language models configured to perform one or more NLP tasks. The NLP tasks include, but are not limited to, text generation, query processing, machine translation, chatbots, and the like. In one or more embodiments, a language model of the model serving system 150 is configured as a transformer neural network architecture (i.e., a transformer model). Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. The language model can be configured as any other appropriate architecture including, but not limited to, transformer-based networks, long short-term memory (LSTM) networks, Markov networks, BART, generative-adversarial networks (GAN), diffusion models (e.g., Diffusion-LM), and the like.

In one or more embodiments, the task for the model serving system 150 is based on knowledge of the online concierge system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one or more embodiments, the online concierge system 140 is connected to an interface system 160. The interface system 160 receives external data from the online concierge system 140 and builds a structured index over the external data using, for example, another machine-learned language model or heuristics. The interface system 160 receives one or more queries from the online concierge system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online concierge system 140 can generate a prompt using the external data as context, often times, the amount of information in the external data exceeds prompt size limitations configured by the machine-learned language model. The interface system 160 can resolve prompt size limitations by generating a structured index of the data and offers data connectors to external data sources.

The smart shopping cart 170 is a shopping cart with one or more sensors and a computing device. The one or more sensors may detect various information relating to the smart shopping cart 170. The sensors may include cameras and/or load sensors coupled to the baskets of the smart shopping cart 170. The cameras can capture image data of items obtained. The load sensors can capture load data indicating a load on each basket. Further example sensors include a scanner for scanning items that are placed into the smart shopping cart 170, a tracking device for tracking a position of the smart shopping cart 170 in the retail environment, etc. The computing device of the smart shopping cart 170 processes the data captured by the sensors and, optionally, other data provided from other components of the system environment, e.g., the customer client device 100, the picker client device 110, the retail computing system 120, the online concierge system 140, etc. The computing device can provide content to the user of the smart shopping cart 170 during their shopping trip. The functionality of the smart shopping cart 170 is further described in FIGS. 3-6B.

In some examples, a customer can use the smart shopping cart 170. In such examples, the smart shopping cart 170 may access a profile on the customer, e.g., to retrieve relevant user preference data. The customer could also provide a shopping list, such that the smart shopping cart 170 can assist the customer in filling the shopping list, e.g., like an order.

In other examples, a picker can use the smart shopping cart 170 to fulfill orders by customers of the online concierge system 140. In such examples, the smart shopping cart 170 can perform functionality of the picker client device 110. The smart shopping cart 170 may also generate and provide fulfillment instructions to assist the picker in fulfilling the batch of orders.

Figure 1B:
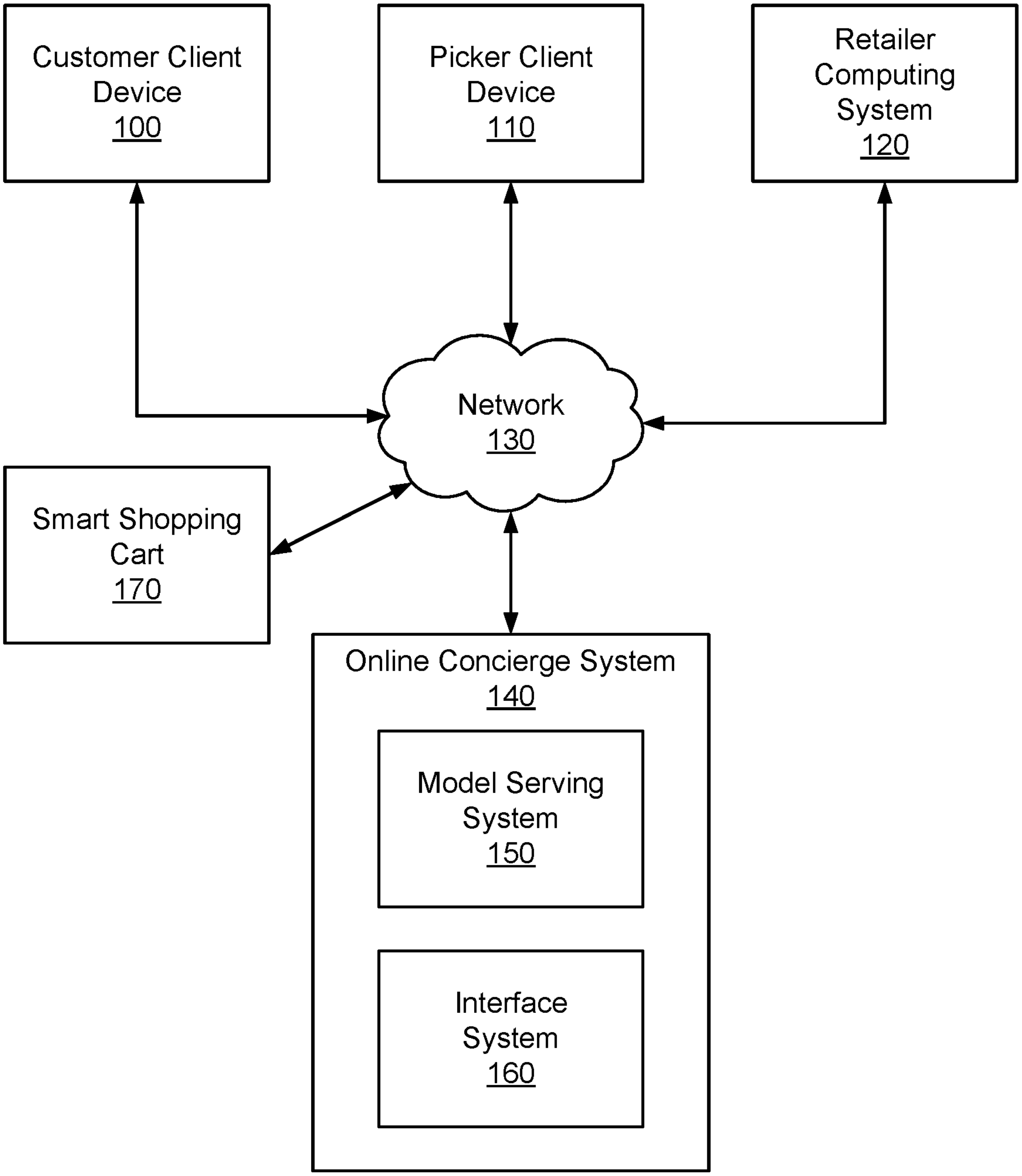
FIG. 1B illustrates an example system environment for an online concierge system, in accordance with one or more embodiments.

FIG. 1B illustrates an example system environment for an online concierge system 140, in accordance with one or more embodiments. The system environment illustrated in FIG. 1B includes a customer client device 100, a picker client device 110, a retailer computing system 120, a network 130, an online concierge system 140, and a smart shopping cart 170. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online concierge system 140. In one or more embodiments, as illustrated in the example system environment in FIG. 1B, the model serving system 150 and/or the interface system 160 is managed and deployed by the entity managing the online concierge system 140. The online concierge system 140 is described in further detail below with regards to FIG. 2.

Online Concierge System Architecture

Figure 2:
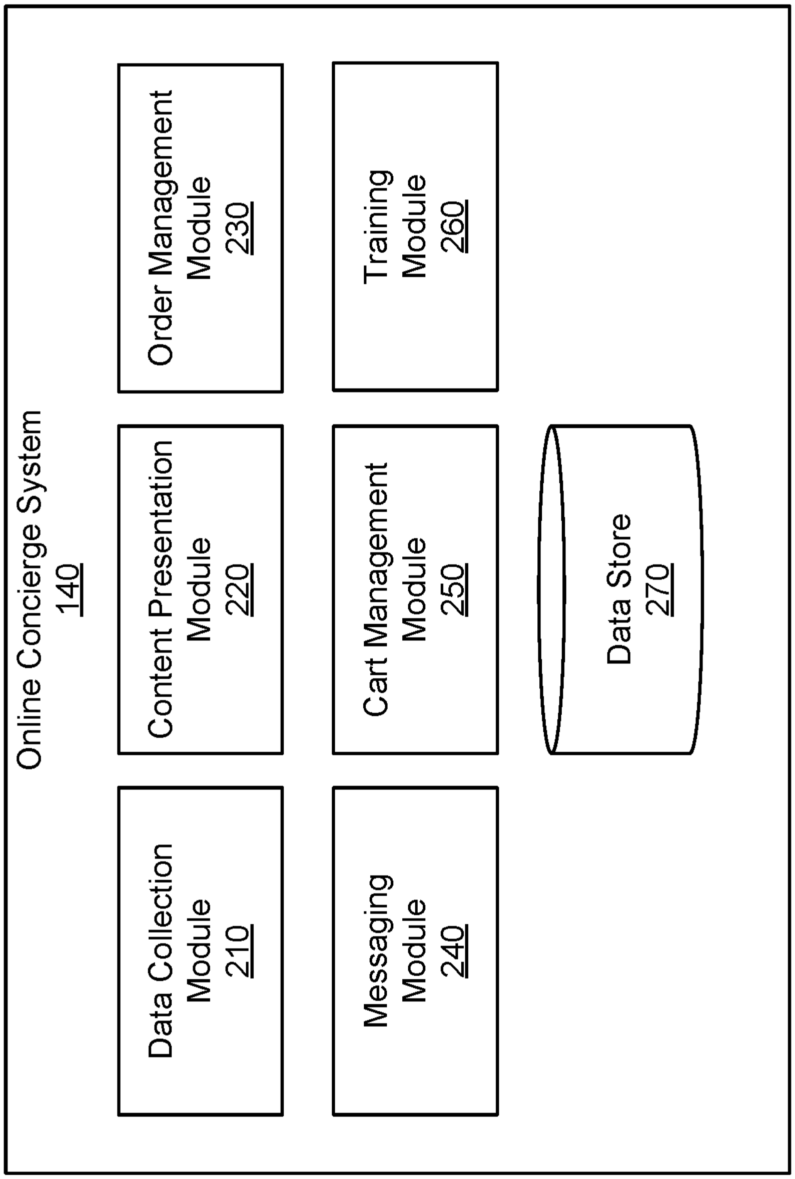
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 210, a content presentation module 220, an order management module 230, a messaging module 240, a cart management module 250, a training module 260, and a data store 270. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 210 collects data used by the online concierge system 140 and stores the data in the data store 270. The data collection module 210 may only collect data describing a user if the user has previously explicitly consented to the online concierge system 140 collecting data describing the user. Additionally, the data collection module 210 may encrypt all data, including sensitive or personal data, describing users.

For example, the data collection module 210 collects customer data, which is information or data that describe characteristics of a customer. Customer data may include a customer's name, address, other demographic information (e.g., age range, family size, dietary restrictions or preferences, etc.), shopping preferences (e.g., shopping frequency, shopping magnitude, etc.), previous orders, favorite items, favorite types of items, favorite retailers, favorite pickers, repeat pickers, or stored payment instruments. The customer data also may include default settings established by the customer, such as a default retailer/retailer location, payment instrument, delivery location, or delivery timeframe. The customer data may also include user preference data indicating one or more preferences, e.g., provided by the user and/or inferred by the online concierge system 140. The data collection module 210 may collect the customer data from sensors on the customer client device 100 or based on the customer's interactions with the online concierge system 140.

The data collection module 210 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the dependability of items in retailer locations, also referred to as "dependability." For example, for each item-retailer combination (a particular item at a particular warehouse), the item data may include a time that the item was last found, a time that the item was last not found (a picker looked for the item but could not find it), the rate at which the item is found, or the popularity of the item. The data collection module 210 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 210 also collects picker data, which is information or data that describes characteristics of pickers. For example, the picker data for a picker may include the picker's name, the picker's location, how often the picker has serviced orders for the online concierge system 140, a customer rating for the picker, a number of customers that have favorited the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, payment information by which the picker is to be paid for servicing orders (e.g., a bank account), feedback from the picker in fulfilling customer orders, etc. The data collection module 210 collects picker data from sensors of the picker client device 110 or from the picker's interactions with the online concierge system 140.

Additionally, the data collection module 210 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 220 selects content for presentation to a user. For example, the content presentation module 220 selects which items to present to a customer while the customer is placing an order. The content presentation module 220 generates and transmits an ordering interface for the customer to order items. The content presentation module 220 populates the ordering interface with items that the customer may select for adding to their order. In some embodiments, the content presentation module 220 presents a catalog of all items that are available to the customer, which the customer can browse to select items to order. The content presentation module 220 also may identify items that the customer is most likely to order and present those items to the customer. For example, the content presentation module 220 may score items and rank the items based on their scores. The content presentation module 220 displays the items with scores that exceed some threshold (e.g., the top n items or the p percentile of items).

The content presentation module 220 may use a scoring function to score items for presentation to a customer. The scoring function may score items for a customer based on item data for the items and customer data for the customer. The scoring function may determine a ranking score based on ranking parameter values for each item and a weight vector. In some embodiments, an item selection model trained as a machine-learning model may determine a likelihood that the customer will order the item. In some embodiments, the item selection model uses item embeddings describing items and customer embeddings describing customers to score items. These item embeddings and customer embeddings may be generated by separate machine-learning models and may be stored in the data store 270.

The order management module 230 manages orders for items from customers. The order management module 230 receives orders from a customer client device 100 and assigns the orders to pickers for service based on picker data. For example, the order management module 230 assigns an order to a picker based on the picker's location and the location of the retailer from which the ordered items are to be collected. The order management module 230 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 230 determines when to assign an order to a picker based on a delivery timeframe requested by the customer with the order. The order management module 230 computes an estimated amount of time that it would take for a picker to collect the items for an order and deliver the ordered items to the delivery location for the order. The order management module 230 assigns the order to a picker at a time such that, if the picker immediately services the order, the picker is likely to deliver the order at a time within the requested timeframe. Thus, when the order management module 230 receives an order, the order management module 230 may delay in assigning the order to a picker if the requested timeframe is far enough in the future (i.e., the picker may be assigned at a later time and is still predicted to meet the requested timeframe).

When the order management module 230 assigns an order to a picker, the order management module 230 transmits the order to the picker client device 110 associated with the picker, e.g., with the content presentation module 220. The order management module 230 may also transmit navigation instructions from the picker's current location to the retailer location associated with the order. If the order includes items to collect from multiple retailer locations, the order management module 230 identifies the retailer locations to the picker and may also specify a sequence in which the picker should visit the retailer locations.

The order management module 230 may track the location of the picker through the picker client device 110 to determine when the picker arrives at the retailer location. When the picker arrives at the retailer location, the order management module 230 transmits the order to the picker client device 110 for display to the picker. As the picker uses the picker client device 110 to collect items at the retailer location, the order management module 230 receives item identifiers for items that the picker has collected for the order. In some embodiments, the order management module 230 receives images of items from the picker client device 110 and applies computer-vision techniques to the images to identify the items depicted by the images. The order management module 230 may track the progress of the picker as the picker collects items for an order and may transmit progress updates to the customer client device 100 that describe which items have been collected for the customer's order.

In some embodiments, the order management module 230 tracks the location of the picker within the retailer location. The order management module 230 uses sensor data from the picker client device 110 or from sensors in the retailer location to determine the location of the picker in the retailer location. The order management module 230 may transmit, to the picker client device 110, instructions to display a map of the retailer location indicating where in the retailer location the picker is located. Additionally, the order management module 230 may instruct the picker client device 110 to display the locations of items for the picker to collect, and may further display navigation instructions for how the picker can travel from their current location to the location of a next item to collect for an order.

The order management module 230 determines when the picker has collected all of the items for an order. For example, the order management module 230 may receive a message from the picker client device 110 indicating that all of the items for an order have been collected. Alternatively, the order management module 230 may receive item identifiers for items collected by the picker and determine when all of the items in an order have been collected. When the order management module 230 determines that the picker has completed an order, the order management module 230 transmits the delivery location for the order to the picker client device 110. The order management module 230 may also transmit navigation instructions to the picker client device 110 that specify how to travel from the retailer location to the delivery location, or to a subsequent retailer location for further item collection. The order management module 230 tracks the location of the picker as the picker travels to the delivery location for an order, and updates the customer with the location of the picker so that the customer can track the progress of the order. In some embodiments, the order management module 230 computes an estimated time of arrival of the picker at the delivery location and provides the estimated time of arrival to the customer.

The order management module 230 coordinates payment by the customer for the order. The order management module 230 uses payment information provided by the customer (e.g., a credit card number or a bank account) to receive payment for the order. In some embodiments, the order management module 230 stores the payment information for use in subsequent orders by the customer. The order management module 230 computes a total cost for the order and charges the customer that cost. The order management module 230 may provide a portion of the total cost to the picker for servicing the order, and another portion of the total cost to the retailer. The order management module 230 may further provide an option to the customer to provide a tip to the picker, e.g., for outstanding service.

The messaging module 240 facilitates communication between the customer client device 100 and the picker client device 110. As noted above, a customer may use a customer client device 100 to send a message to the picker client device 110. The messaging module 240 receives the message from the customer client device 100 and transmits the message to the picker client device 110 for presentation to the picker. The picker may use the picker client device 110 to send a message to the customer client device 100 in a similar manner. Communications between the customer and the picker may be provided to the content presentation module 220 in scoring items for a customer.

The cart management module 250 manages the smart shopping carts in use at a retailer location. In some embodiments, management may include performing analyses of the data captured by the sensors of the smart shopping cart and providing content to the user of the smart shopping cart via an electronic display of the shopping cart. In some embodiments, the cart management module 250 may collect data from the smart shopping carts, e.g., to train models implemented with the data. In such embodiments, the online concierge system 140 may train the models, e.g., via the training module 260, and provide the trained models to the smart shopping carts. The cart management module 250 may also provide data to the smart shopping carts, e.g., information on users, user preference data, historical orders by users, information on items at the retailer locations, traffic flow of a retailer location, orders to be fulfilled, etc.

The training module 260 trains machine-learning models used by the online concierge system 140. For example, the training module 260 may train the item selection model, the dependability model, the query processing models, the models associated with the smart shopping cart (described below in FIGS. 3-6B), or any of the machine-learned models deployed by the model serving system 150. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The training module 260 generates the set of parameters (e.g., the particular values of the parameters) for a machine-learning model by "training" the machine-learning model. Once trained, the machine-learning model uses the set of parameters to transform inputs into outputs.

The training module 260 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The training module 260 may apply an iterative process to train a machine-learning model whereby the training module 260 updates parameter values of the machine-learning model based on each of the set of training examples. The training examples may be processed together, individually, or in batches. To train a machine-learning model based on a training example, the training module 260 applies the machine-learning model to the input data in the training example to generate an output based on a current set of parameter values. The training module 260 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross-entropy loss function. The training module 260 updates the set of parameters for the machine-learning model based on the score generated by the loss function. For example, the training module 260 may apply gradient descent to update the set of parameters.

The data store 270 stores data used by the online concierge system 140. For example, the data store 270 stores customer data, retailer data, item data, order data, and picker data for use by the online concierge system 140. The data store 270 also stores trained machine-learning models trained by the training module 260. For example, the data store 270 may store the set of parameters for a trained machine-learning model on one or more non-transitory, computer-readable media. The data store 270 uses computer-readable media to store data, and may use databases to organize the stored data.

With respect to the machine-learned models hosted by the model serving system 150, the machine-learned models may already be trained by a separate entity from the entity responsible for the online concierge system 140. In one or more other embodiments, when the model serving system 150 is included in the online concierge system 140, the training module 260 may further train parameters of the machine-learned model based on data specific to the online concierge system 140 stored in the data store 270. As an example, the training module 260 may obtain a pre-trained transformer language model and further fine tune the parameters of the transformer model using training data stored in the data store 270. The training module 260 may provide the model to the model serving system 150 for deployment.

Smart Shopping Cart

Figure 3:
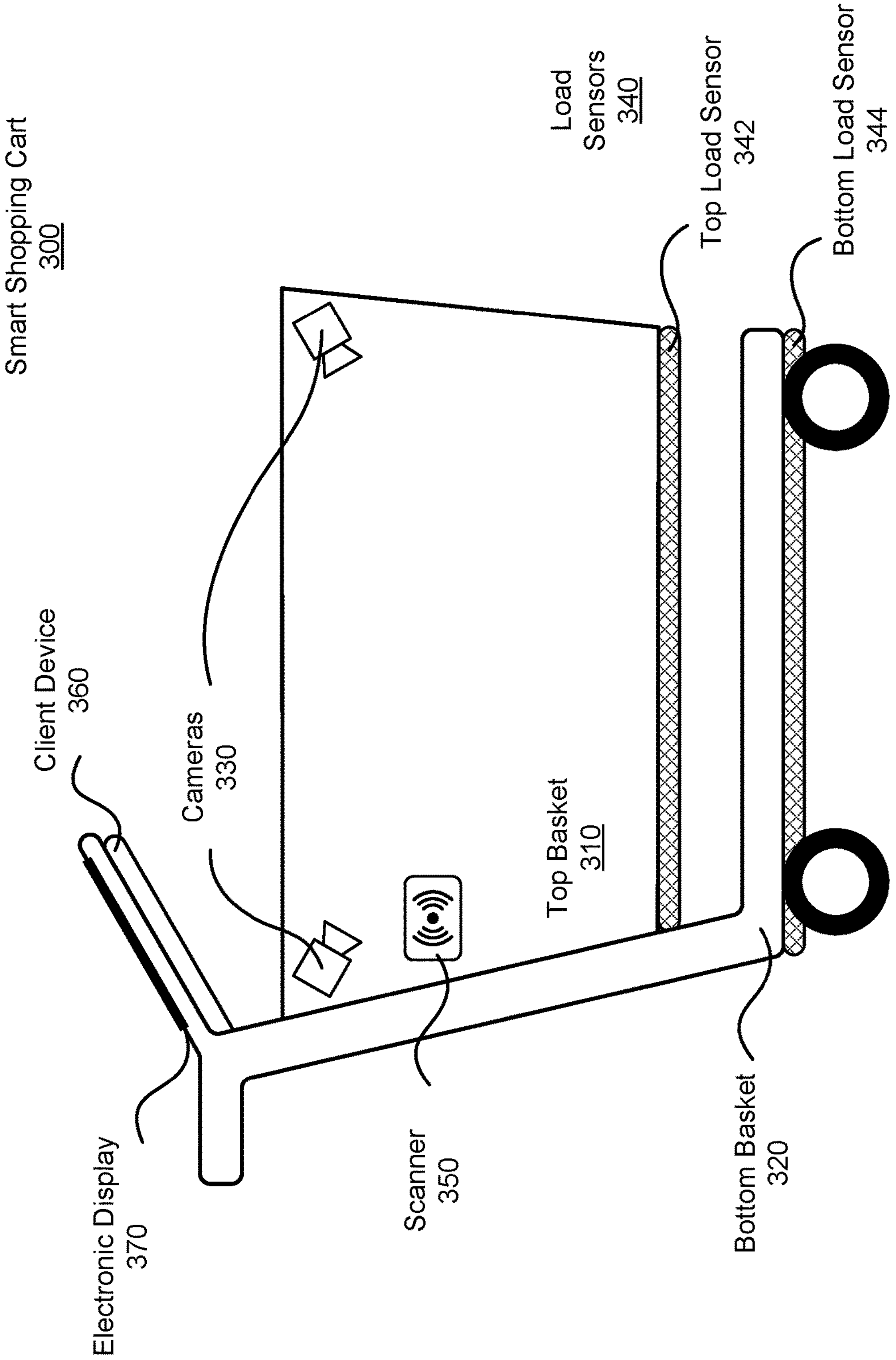
FIG. 3 illustrates a smart shopping cart, in accordance with one or more embodiments.

FIG. 3 illustrates a smart shopping cart 300, in accordance with some embodiments. The smart shopping cart 300 is an embodiment of the smart shopping cart 170. The smart shopping cart 300 may be operated by a user in a retailer location to obtain and purchase items listed for sale in the retailer location. In one or more embodiments, the smart shopping cart 300 includes a top basket 310 and a bottom basket 320 atop a set of wheels. The smart shopping cart 300 further comprises a plurality of cameras 330, load sensors 340, a scanner 350, a client device 360, and an electronic display 370. Alternative embodiments may include more, fewer, or different components from those illustrated in FIG. 3, and the functionality of each component may be divided between the components differently from the description below. For example, the smart shopping cart 300 may further include other input and/or output devices, e.g., microphones or speakers. Additionally, each component may perform their respective functionalities in response to a request from a human, or automatically without human intervention.

The baskets store items obtained by a user whilst traversing the retailer location and prior to checking out. As shown in FIG. 3, the baskets may include, e.g., a top basket 310 and a bottom basket 320. In other embodiments, there may be any other number of baskets. In additional embodiments, a basket may be subdivided into multiple compartments. In yet additional embodiments, the baskets may be disparately dimensioned, e.g., one basket may be shallow and positioned near the handle, whereas another basket may be deep and cylindrical for storing long skinny items.

The cameras 330 capture image data of an interior of the baskets. In general, the cameras 330 capture image data to identify and detect items placed in the smart shopping cart 300. The captured image data may include photos or video. In the embodiments shown in FIG. 3, the cameras 330 are positioned internal facing for the top basket 310.

In other embodiments, each basket may include one or more of the cameras 330 positioned to identify and detect items placed in the respective baskets. In yet other embodiments, a subset of the baskets may include one or more cameras, whereas other baskets do not have dedicated cameras. In still other embodiments, cameras may be positioned to be in view of one or more baskets, i.e., having a field of view that encompasses the one or more baskets.

The load sensors 340 measure a weight of items placed in the baskets. Each load sensor generates load data indicating a measure of weight or mass of items placed in each respective basket over time. For example, the load data may be zeroed when the basket is emptied, and, when a user places a first item into the basket, the load sensor may record the change in load atop the load the sensor as the load data. The load data may be time series data of the total load, or change in load. In other embodiments, the load data may indicate a load per item placed into the smart shopping cart 300 recorded at a particular timestamp during the shopping trip.

In one or more embodiments, each basket may be coupled to a load sensor. In other embodiments, a subset of baskets may be outfitted with load sensors, whereas others do not have dedicated load sensors. As shown in FIG. 3, there is a top load sensor 315 for the top basket 310 and a bottom load sensor 325 for the bottom basket 320. In some embodiments, a load sensor may include one or more load sensing devices, e.g., for sensing the loads on different portions of a basket.

In some embodiments, the smart shopping cart 300 includes the scanner 350. In such embodiments, the scanner 350 may scan uniquely tagged items. The scanner 350 may record the entering of the uniquely tagged items as scan data. The range of the scanner 350 may toggled to only detect items placed into the smart shopping cart 300, while not registering nearby external items as entering the cart.

In one or more embodiments, the scanner 350 is a radio-frequency identification (RFID) scanner. Accordingly, items available at the retailer location are tagged with RFID chips. The RFID chips may use active emission and/or passive emission. To be an active emitter, the RFID chip includes a power source (e.g., a battery) that enables the RFID chip to emit a distinct radio-frequency signature. To be a passive emitter, the RFID chip does not have its own power source. Rather, the RFID chip receives power from the RFID scanner's electromagnetic waves, thereby inducing a current in the RFID chip's antenna.

In other embodiments, the scanner 350 may be a barcode scanner. In such embodiments, each item may be tagged with a barcode. The retailer system may log a database of items with corresponding barcodes, such that the scanner 350 may capture light reflected off the barcode to determine the unique barcode signature of the item. In other embodiments, the scanner 350 may be a quick-response (QR) code scanner. Similarly to the barcode scanner, each item is tagged with a QR code that is unique to the item. The scanner 350 captures an image of the QR code and compares the detected QR code to a database of QR codes associated with items to identify an item that has entered the smart shopping cart 300.

The client device 360 is a computing device that analyzes the data captured by the smart shopping cart 300. The client device 340 may perform functionality of the customer client device 100 and the picker client device 110. In the context of a customer utilizing the smart shopping cart 300, the client device 340 may present content that would be presented to the customer client device 100, e.g., content recommending various items. In the context of a picker utilizing the smart shopping cart, the client device 340 may present content that would be presented to the picker client device 110, e.g., an order assigned to the picker and comprising a list of items and their positions in the retailer location. Accordingly, the client device 360 may be communicatively connected to an online system (e.g., the online concierge system 140, via the network 130). In general, the client device 360 analyzes the data captured by the smart shopping cart 300 to determine content for the user of the smart shopping cart 300. Example analyses include determining a remaining capacity of the baskets and applying a capacity-informed model to the remaining capacity to determine one or more items to recommend to the user. Other example analyses include determining an occupancy state of obtained items in the baskets and applying a fulfillment optimization model to the occupancy state to determine fulfillment instructions, e.g., for a fulfillment user. The fulfillment instructions may include determining a next item to obtain, determining navigation instructions to the next item, performing a replacement workflow for an unavailable item, determining packing instructions for the fulfillment user, or some combination thereof.

The electronic display 370 provides an interface for a user of the smart shopping cart 300. The electronic display 370 may be configured to provide content to a user and may also be configured to receive user input. The electronic display 370 may include other input and/or output devices, e.g., a microphone and/or a speaker. The electronic display 370 may be a component of the client device 360.

In some embodiments, the smart shopping cart 300 may include a tracking device for tracking of a position of the smart shopping cart in the retailer location. For example, the tracking device may be BlueTooth enabled, RFID enabled, GPS enabled, etc. Other technologies for tracking may also be implemented. For example, the retailer location may be outfitted with a camera system to capture images of the smart shopping carts as they traverse around the retail environment.

Smart Shopping Cart Configuration Management

Figure 4:
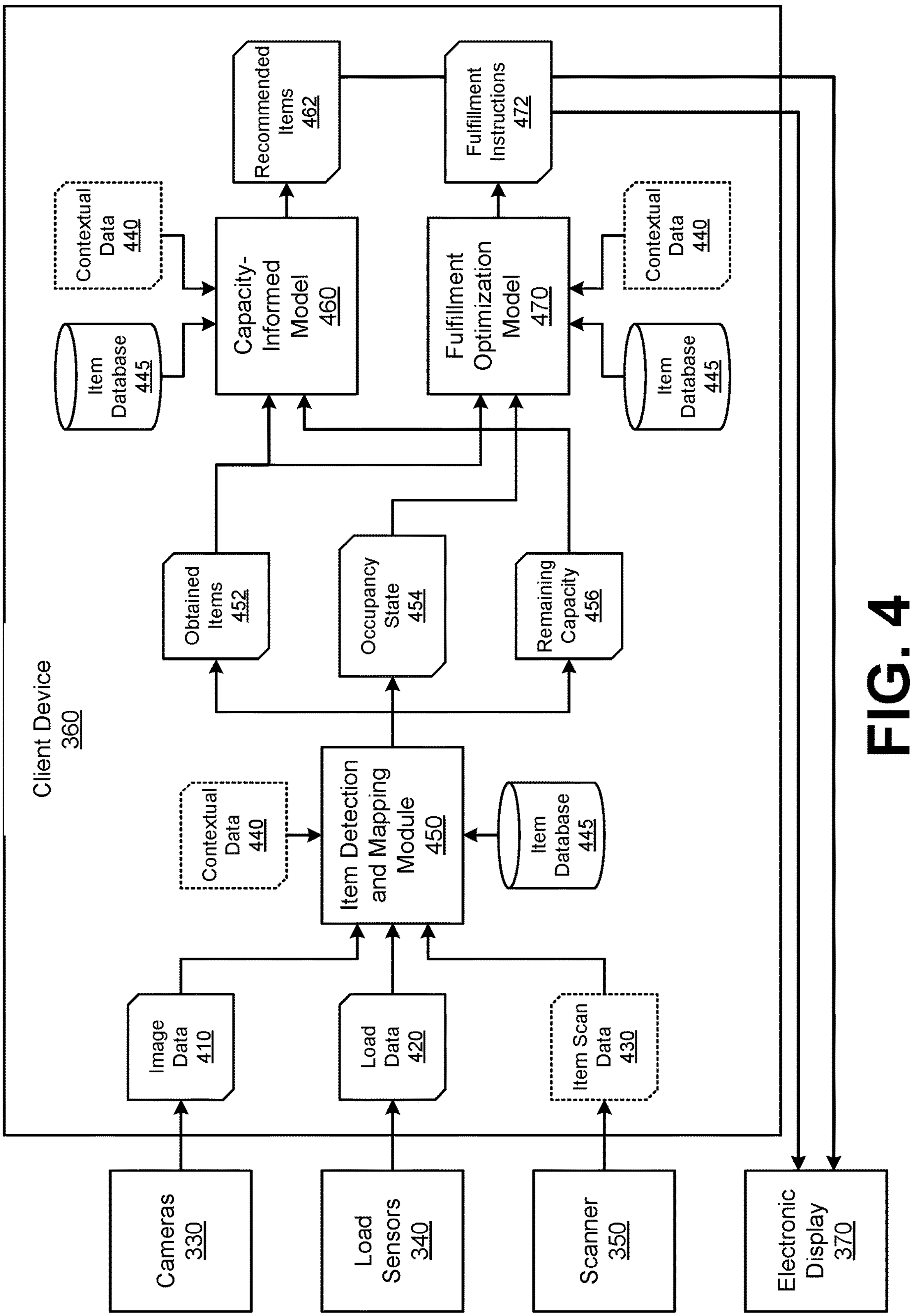
FIG. 4 is an illustrative flowchart describing various aspects of managing a smart shopping cart's item configuration, in accordance with one or more embodiments.

FIG. 4 is an illustrative flowchart describing various aspects of managing a smart shopping cart's item configuration, in accordance with one or more embodiments. The description of FIG. 4 focuses on the interplay between sensors of the smart shopping cart 300 and the client device 360 of the smart shopping cart 300. In other embodiments, some or all of the functionality of the client device 360 described in FIG. 4 can be performed by the online concierge system 140. Moreover, the principles described in FIG. 4 are applicable to any user, e.g., a customer or a picker.

The sensors of the smart shopping cart 300 capture data that is provided to the client device 360. As illustrated in FIG. 4, the cameras 330 provide image data 410, the load sensors 340 provide load data 420, and the scanner 350 provides item scan data 430. The client device 360 may include an item detection and mapping module 450 that inputs the captured data to determine one or more obtained items 452, an occupancy state 454 of the smart shopping cart 300, and remaining capacity 456 in the smart shopping cart 300. The one or more obtained items 452 refer to items that have been obtained by the user and placed in the smart shopping cart 300. The occupancy state 454 refers to each item's occupancy configuration in the smart shopping cart 300, e.g., which may include a position and/or an orientation of the item relative to the smart shopping cart 300. The remaining capacity 456 refers to an amount of available capacity in the smart shopping cart 300 to place additional items. The remaining capacity may be measured by physical space, weight, or some combination thereof.

The item detection and mapping module 450 further leverages an item database 445, which stores information on items offered by the retailer location. The item database 445 may be a component of or part of the data store 270. For example, the item detection and mapping module 450 may determine the occupancy configuration of each item based on a known dimensionality of the item. In another example, the item detection and mapping module 450 may use known items to differentiate between different size offerings of a product, e.g., the 6-pack soda weighs differently than the 12-pack soda.

The item detection and mapping module 450 may further input other contextual data 440. For example, the contextual data 440 may include one or more characteristics of the smart shopping cart 300, one or more characteristics of the user operating the smart shopping cart 300, user preference data, tracking data of the smart shopping cart 300, order information being fulfilled by the user (e.g., in instances where the user is a picker), or other data in the online concierge system 140. For example, knowing dimensionality of the one or more baskets in the smart shopping cart 300 informs the remaining capacity 456 in the smart shopping cart 300. A smaller shopping cart has less overall capacity than a larger shopping cart. In another example, knowing the characteristics of the user may tailor the overall capacity. A small user would likely have a harder time pushing around a heavy cart as compared to a tall user. Accordingly, the item detection and mapping module 450 may modify the overall capacity to adjust to predicted capabilities of each user. Such personalization may further be refined over different trips by the user. For example, the user may historically fill on average 75% of the cart during each trip, such that the user's overall capacity may be informed by that historical order data. As another example, another user may historically overfill the cart, such that the user's overall capacity may be greater than the normal overall capacity.

The item detection and mapping module 450 may identify the obtained items 452 based on the image data 410, the load data 420, and, optionally, the item scan data 430. In instances with the item scan data 430, the items detected in the item scan data 430 would be the obtained items 452. In such instances, the image data 410 and the load data 420 may be used to verify the item scan data 430. In instances without the item scan data 430, the item detection and mapping module 450 may utilize an item detection model that matches images pertaining to the item from the image data 410 and a weight of the item from the load data 420 to stored images and a stored weight of the item in the item database 445. For example, the item detection and mapping module 450 may leverage an image classifier to determine the item from the image data. In other embodiments, another type of classification model may be trained and implemented to input both the image data 410 and the load data 420 to classify which item was obtained. The contextual data 440 may also be used in the identification process. For example, if an item entering the smart shopping cart 300 is known to be shelved in a different aisle than the aisle where the smart shopping cart 300 currently is positioned in, then the item detection and mapping module 450 may annotate the discrepancy and/or invalidate the item detection.

The item detection and mapping module 450 may determine the occupancy state 454 based on known dimensionality of obtained items, e.g., from the item database 445. The item detection and mapping module 450 may create the occupancy state 454 as a spatial representation of where the obtained items 452 are located in the smart shopping cart 300. For example, the item detection and mapping module 450 may create the occupancy state 454 identifying the relative position and/or the orientation of the obtained items 452 in each of the baskets of the smart shopping cart 300. The space filled by an obtained item may be based on known dimensionality of the obtained item, e.g., the watermelon is spheroid in shape, the bag of chips has an amorphous shape, the canned soup has a cylindrical shape. The item detection and mapping module 450 may also determine the dimensionality during deployment based on the image data. For example, the item detection and mapping module 450 may implement a 3D modeling algorithm that compiles various perspectives of an item to estimate a 3D digital representation of the item. The positioning of each obtained item may be determined by the image data 410 and/or the load 420. For example, the image data 410 and/or the load data 420 may indicate a particular orientation and a particular position of the item in the basket.

The item detection and mapping module 450 may determine the remaining capacity 456 as a difference between the overall spatial capacity of the smart shopping cart 300 and the occupied space by the obtained items 452. In such embodiments, the capacity of the smart shopping cart 300 is measured by physical space. Accordingly, initially the overall spatial capacity of the cart may be based on dimensions of each basket, e.g., top basket is 1 meter long by 0.5 meter wide by 0.5 meter deep. As noted above, the overall capacity may be tailored based on the user, based on the user's characteristics and/or shopping preferences. The item detection and mapping module 450 may calculate the occupied space based on known dimensionalities of obtained items 452. The item detection and mapping module 450 may also leverage the image data 410 and/or the load data 420 to adjust the occupied space if, e.g., the obtained items are not in optimal packing configuration.

The item detection and mapping module 450 may determine the remaining capacity 456 as a difference between an overall load capacity of the smart shopping cart 300 and the current load of the obtained items 452. In such embodiments, the capacity of the smart shopping cart 300 is measured by load. The initial overall load capacity may be based on a maximum acceptable load based on the average user, or rated by a manufacturer of the smart shopping cart 300, e.g., the overall load capacity is 300 pounds or 135 kilograms. The overall load capacity may also be tailored to the user, e.g., to accommodate the user's capabilities. The item detection and mapping module 450 calculates the current load based on the load data 420. For example, if there's 50 pounds of items in the top basket and 20 pounds of items in the bottom basket, then there would be a current load of 70 pounds. In general, load may be measured by weight or by mass.

The item detection and mapping module 450 may also determine the remaining capacity 456 as based on both the remaining spatial capacity and the remaining load capacity. In one or more embodiments, both metrics may be evaluated, and the lesser remaining capacity controls. For example, if the remaining spatial capacity is 0, but the remaining load capacity is 50 pounds, the item detection and mapping module 450 may deem the cart to be full, i.e., there is no remaining capacity. In other embodiments, the remaining capacity 456 is based on a combination (e.g., a weighted combination) of the two metrics.

The capacity-informed model 460 determines one or more recommended items 462 based on the obtained items 452 and the remaining capacity 456. The capacity-informed model 460 may be a machine-learning model trained to predict a likelihood that an item is obtained by the user when recommended (also referred to as a conversion likelihood). The capacity-informed model 460 may assess the likelihood based on the obtained items 452 and the remaining capacity 456. For example, the capacity-informed model 460 may maintain a promoted list of items that may be recommended to users, e.g., identified in the item database 445. In some example implementations, the promoted list may include all items offered by the retailer. The capacity-informed model 460 may remove items in the promoted list based on items already obtained by the user. For example, the promoted list of items may include a particular ice cream, but the user has already obtained that ice cream, so that item is withheld from recommendation. The capacity-informed model 460 determines a conversion likelihood for each item in the promoted list, and the capacity-informed model 460 determines the one or more recommended items based on the conversion likelihoods. For example, the capacity-informed model 460 may rank all items in the promoted list based on the conversion likelihoods to determine the recommended items from top-ranked items.

In one or more embodiments, the capacity-informed model 460 may utilize the remaining capacity 456 to prescreen items. For example, the item database 445 stores a set of items that is available for recommending to the user. The capacity-informed model 460 may filter out items that are greater than the remaining capacity (e.g., bigger than the remaining spatial capacity, or heavier than the remaining load capacity). The capacity-informed model 460 may determine the conversion likelihood for each item in the filtered set, and subsequently determine the one or more recommended items from the filtered set and based on the conversion likelihoods. In other embodiments, the capacity-informed model 460 may use the remaining capacity 456 as a post-filter. For example, the capacity-informed model 460 may determine the likelihoods for all items in the promoted list, then screen items that are greater than the remaining capacity.

The capacity-informed model 460 may further input other contextual data 440 in determining the likelihoods of each item in the promoted list. For example, the capacity-informed model 460 may input a user preference data. This may result in determining higher conversion likelihoods for favorited items over non-favorited items. In another example, the capacity-informed model 460 may determine higher likelihoods for items ordered or purchased more frequently compared to infrequent items. Other contextual data 440 may include a position of the smart shopping cart 300 in the retailer location compared to a position of the items to be promoted, e.g., further away items are less likely to be obtained than items located close by.

In some embodiments, the capacity-informed model 460 may also output a promotion for one recommended item. For example, the capacity-informed model 460 may determine an increase in conversion likelihood as an effect of providing the promotion for the recommended item. If there are a plurality of available promotions, the capacity-informed model 460 may select the promotion that maximizes the increase in conversion likelihood.

The capacity-informed model 460 may be trained on historical order data, e.g., by the training module 260. The training module 260 gathers the historical order data and one or more items recommended during the historical order. The training module 260 may also retrieve the image data and/or the load data associated with the historical orders. The training module 260 may score the recommended items in the historical orders based on whether the user ended up obtaining the recommended item. For example, if the user obtained the item, then the training module 260 may score the recommended item with a score of 1, and, alternatively, a score of 0, if not obtained. The training module 260 may train the capacity-informed model 460 with the recommended items and corresponding score, informed also by the already obtained items and/or the remaining capacity. The capacity-informed model 460 may output a binary label, e.g., recommend or not recommend, or may output a score indicating a likelihood that the item will be obtained, e.g., in the range of 0 to 1.

The electronic display 370 of the smart shopping cart 300 displays the recommended items 462 determined by the capacity-informed model 460. In some embodiments, the client device 360 includes the electronic display 370 (and/or other output devices) that can present content to the user indicating the recommended items. For example, an image of the recommended item may be popped up on the electronic display 370. In additional embodiments, the electronic display 370 may also display the accompanying promotion for the recommended item, e.g., 10% off coupon. In yet other embodiments, the electronic display 370 may display instructions to locate the recommended item. For example, the electronic display 370 may indicate that the recommended item is further down the aisle, on the left, on the $2^{nd}$ shelf from the top. The electronic display 370 may further display multiple recommended items, e.g., with a title that reads "Check-out these items!" In some embodiments, the user may swipe through the different recommended items, e.g., ordered based on the predicted conversion likelihoods.

The fulfillment optimization model 470 determines fulfillment instructions 472 to optimize fulfillment efficiency of a user (e.g., a picker). In one or more embodiments, the user of the smart shopping cart 300 is a picker assigned a batch of orders by customers of the online concierge system 140, the batch of orders to be fulfilled by the picker. The fulfillment instructions 472 may be generated or updated in real-time based on current data received by the smart shopping cart 300, e.g., the image data 410, the load data 420, the item scan data 430, other data captured by sensors in the system, or some combination thereof. The fulfillment instructions 472 may include a next item to obtain, instructions to locate the next obtain, packing instructions for the next item, instructions to rearrange one or more obtained items, or some combination thereof. The fulfillment optimization model 470 inputs the obtained items 452, the occupancy state 454, and data about items to be obtained in the batch of orders from the item database 445 to determine the fulfillment instructions.

In some embodiments, the fulfillment optimization model 470 determines packing instructions of the next item to obtain. For example, the online system may initially determine an optimal route to obtain all items in the batch of orders. In other examples, further described below, the fulfillment optimization model 470 may also determine the next item to obtain from items remaining to be obtained in the batch of orders. For the next item to obtain, the fulfillment optimization model 470 determines an optimal packing configuration in the smart shopping cart 300. The fulfillment optimization model 470 may determine the optimal packing configuration based on the occupancy state 454 and a known dimensionality of the next item to obtain. The known dimensionality may be stored in the item database 445 and may include, but is not limited to, a shape of the item, physical dimensions of the item, a weight of the item, a distribution of weight of the item, etc. The optimal packing configuration may include a basket of the smart shopping cart 300 to place the item, a position in the basket, an orientation of the item, or some combination thereof.

In some embodiments, the optimal packing configuration may also include instructions on which of a plurality of containers (e.g., zones, bags, or any other packaging vessel) to place an item into. In such embodiments, the occupancy state may divide a basket (or the cart) into different containers put into the basket (or cart). The occupancy state may identify which obtained items were put into which containers and may further assign containers to particular orders in the batch of orders. Accordingly, the optimal packing configuration may include instructions on which container to place the next item to obtain. In some embodiments, the fulfillment optimization model 470 identifies which order the next obtain is part of and, then, may identify which containers are assigned to that order. From those identified containers, the fulfillment optimization model 470 may determine which of the current containers as the optimal packing configuration. The optimal packing configuration may further indicate whether it's optimal to start a new container for the order. For example, if the current containers assigned to order (associated with the next item) are spatially full and/or at a weight limit (e.g., which may leverage principles described under the capacity-informed model 460), then the user may be prompted to start a new container for the order.

In some embodiments, the fulfillment optimization model 470 may determine that the next obtain is obtained but placed in a non-optimal packing configuration. The next item is obtained and detected by the item detection and mapping module 450. The item detection and mapping module 450 may determine the occupancy state inclusive of the next item that was obtained, but the fulfillment optimization model 470 may determine that the next item that was obtained was placed in a non-optimal packing configuration in the cart. For example, the item was put in a wrong orientation, a wrong position, or in a wrong container. The fulfillment optimization model 470 may determine remedial instructions to rearrange the item to remedy the non-optimal packing configuration. The remedial instructions may be displayed by the electronic display 370 with animation, with voice command, with text prompt, or with any other manner of displaying the instructions. In a similar vein, the fulfillment optimization model 470 may also identify an obtained item as not part of any of the orders in the batch. Upon identifying, the fulfillment optimization model 470 may create a notification (e.g., as part of the fulfillment instructions 472) that the obtained item is not part of any order, and may further include a prompt to remove the item.

In one or more embodiments, the fulfillment optimization model 470 further determines the next item to obtain. The fulfillment optimization model 470 may preliminarily cross off items in the batch of orders that have been detected as obtained items 452. With the remaining items in the batch of orders, the fulfillment optimization model 470 may determine which of the remaining items to obtain next. In some embodiments, a current position of the smart shopping cart 300 and positions of the remaining items may be input into the fulfillment optimization model 470 to determine the next item to obtain. In one example implementation, the fulfillment optimization model 470 may determine an efficiency score for each remaining item based on the current position of the smart shopping cart 300 and the positions of the remaining items. The fulfillment optimization model 470 may rank the remaining items based on the efficiency scores and select the top ranked remaining item as the next item to obtain. The fulfillment optimization model 470 may determine an optimal route from the current position to obtain the remaining items.

The current position of the smart shopping cart 300 may be determined by a tracking system. For example, the retailer location may include cameras or other scanners to track positions of the smart shopping cart 300 in the retail environment. The smart shopping cart 300 may further include a tracking device that can aid in the tracking process. For example, the tracking device may be a signal emitter that is triangulated with multiple receivers positioned throughout the retailer location. In other examples, the tracking device may include external facing cameras to track and map a position of the smart shopping cart 300. Other examples of tracking systems may be implemented. The position of the items may be stored in the item database 445.

In some embodiments, the fulfillment optimization model 470 further inputs other contextual data 440 in determining the next item to obtain. In one or more embodiments, the fulfillment optimization model 470 can input traffic flow at the retailer location. With the tracking system, the online system may determine traffic flow throughout the retailer location. In one example representation, the traffic flow may indicate varying degrees of traffic flow (e.g., slow, medium, or fast) at each traversable position in the retailer location. The fulfillment optimization model 470 may utilize the traffic flow to modify the route, e.g., to avoid slow downs in different positions of the retailer location. In other embodiments, the fulfillment optimization model 470 can input user characteristics of the user operating the smart shopping cart 300. The user characteristics may affect when to instruct the user to obtain heavier items, e.g., a smaller user would be more encumbered by obtaining heavier items first.

The fulfillment optimization model 470 may also determine navigation instructions for the next item to be obtained. The fulfillment optimization model 470 may determine the navigation instructions based on the current position of the cart and the position of the next item in the retailer location. The navigation instructions may also be based on the traffic flow. The resulting navigation instructions may include one or more steps to direct the fulfillment user to the next item, e.g., down the aisle, turn right, and turn right at the third aisle, item on the left halfway up the aisle.

In some embodiments, the user identifies the next item to be obtained as unavailable. The user may provide such message or indication through the client device 360 and/or the electronic display 370. In response, the fulfillment optimization model 470 may trigger a replacement workflow to identify a suitable substitution item in lieu of the unavailable item. The fulfillment optimization model 470 may score items in the item database 445 based on similarities between the unavailable item and the other items. Based on the scores, the fulfillment optimization model 470 may select one for display to the user, e.g., via the electronic display 370. The fulfillment optimization model 470 may further consider the other contextual data 440 in determining the substitution item. For example, the fulfillment optimization model 470 may weigh the current position of the cart and the positions of the other items in candidacy for substitution of the unavailable item, e.g., between two similarly scored items, the closer item may be recommended as a substitute. As another example, the fulfillment optimization model 470 may weigh user preference data in determining the score of the items in candidacy as a substitute to the unavailable item.

To train the fulfillment optimization model 470, a training module (e.g., the training module 260) may leverage historical order data and related fulfillment information. For example, the related fulfillment information may include a time of completion of the order (e.g., further broken down into time to obtain each item), fulfillment accuracy, fulfillment satisfaction by a customer of the order, etc. During fulfillment of each historical order, various actions taken and/or fulfillment instructions 472 provided by the client device 360 may be scored for efficiency. In one or more embodiments, the efficiency scores may be assessed as a relative measure between all the historical orders. For example, different actions by different fulfillment users to obtain an item placed a similar distance away took different times, such that the efficiency score of the longer-taking action may be scored lower than the shorter-taking action. In other embodiments, the efficiency scores may be assessed based on theoretical speed of a user. For example, if the user walks at a brisk pace of 1.5 meters per second (~3.35 miles per hour) with an anticipated 15 second window to locate an item on a shelf, then the training module may determine efficiency based on timing of a fulfillment user in relation to the theoretical anticipated time for the action. With the efficiency scores of the various actions taken in the historical orders, the training module may train the fulfillment optimization model 470.

The electronic display 370 displays the fulfillment instructions 472 for view by the fulfillment user. The fulfillment instructions 472 may be animated. For example, the navigation instructions include animated real-time navigation. As another example, the packing instructions demonstratively animate the optimal packing configuration. As a third example, the packing instructions may animate how to rearrange obtained items, to optimize the packing configuration.

Exemplary Methods

Figure 5:
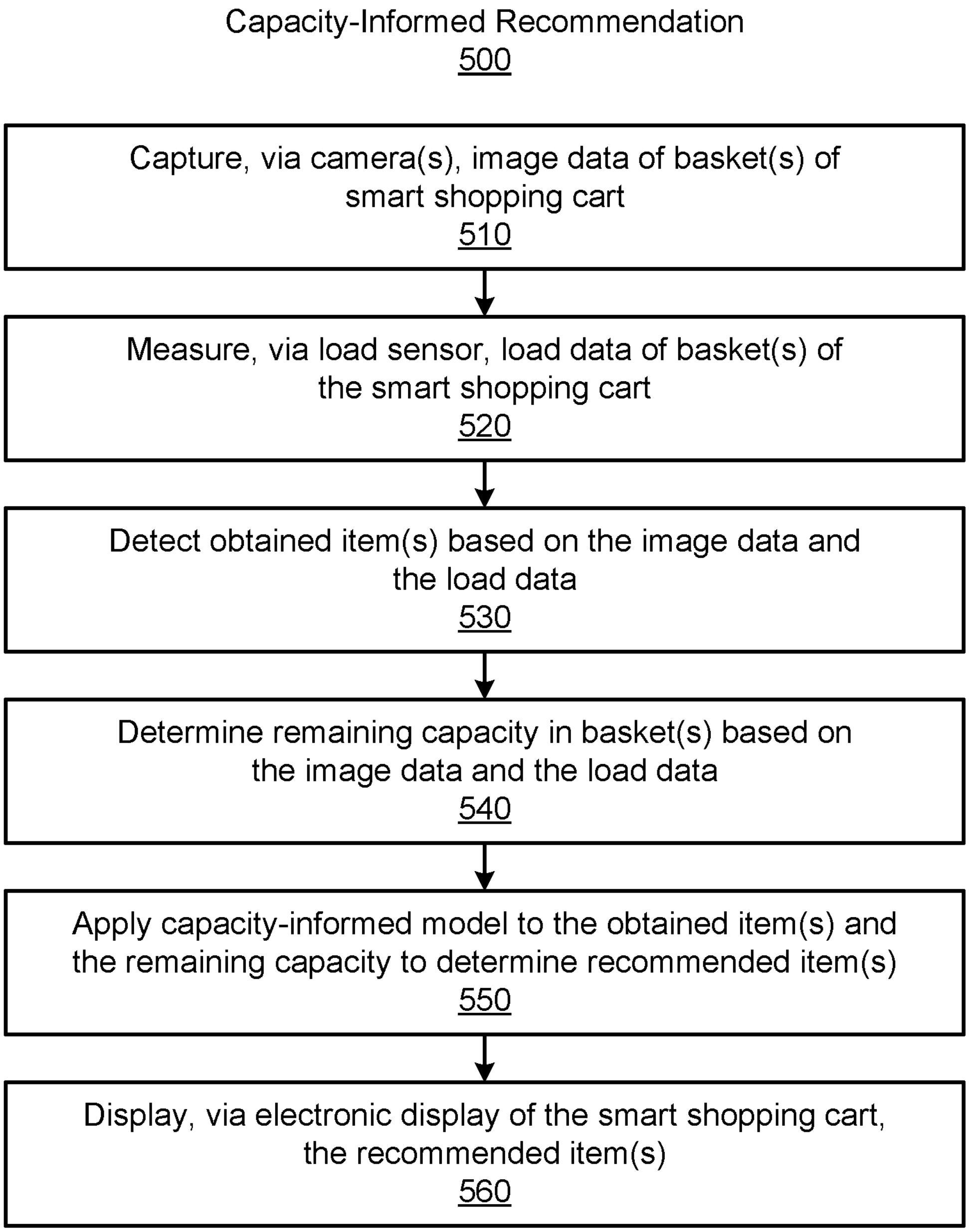
FIG. 5 is a flowchart describing the process of providing capacity-informed recommendations in the context of a smart shopping cart, in accordance with one or more embodiments.

FIG. 5 is a flowchart describing the process of providing capacity-informed recommendations 500 in the context of a smart shopping cart, in accordance with one or more embodiments. The description of FIG. 5 is in the perspective of the smart shopping cart (e.g., the smart shopping cart 300), but in other embodiments, any computing system or device may perform any, some, or all of the steps.

The smart shopping cart captures 510, via one or more cameras, image data of one or more baskets of the smart shopping cart. In some embodiments, the cameras are disparately positioned to be in view of each basket. In other embodiments, some baskets are in view, and other baskets are not. The image data can include images and/or video. The image data may be timestamped.

The smart shopping cart measures 520, via one or more load sensors, load data of the one or more baskets. In one or more embodiments, each basket has a corresponding load sensor. In other embodiments, one or more baskets do not have load sensors coupled. The load data indicates load on the baskets over time.

The smart shopping cart can utilize other sensors to capture additional data. In one or more embodiments, the smart shopping cart may include a scanner that scans items that are placed into the baskets of the smart shopping cart. In other embodiments, the smart shopping cart may include a tracking device to track a current position of the smart shopping cart in the retailer location.

The smart shopping cart detects 530 obtained items based on the image data and the load data. For example, the smart shopping cart may utilize an item detection model to classify images of an item to determine what item from the retailer was obtained. The item detection model may further classify based on weight of the obtained item in the load data. The item detection model may further input other data, e.g., item scan data, tracking data.

The smart shopping cart determines 540 remaining capacity in baskets of the smart shopping cart based on the image data and the load data. In one or more embodiments, based on the detected items, the smart shopping cart can determine known dimensionalities of the detected items to calculate space occupied by the detected items. The smart shopping cart can determine a remaining spatial capacity based on a difference between the overall spatial capacity and the current occupied space. In other embodiments, the smart shopping cart can determine a remaining load capacity based on the load data. The smart shopping cart can determine the remaining load capacity by comparing the current load on the baskets to an overall load capacity of the baskets. In some embodiments, the remaining capacity is based on both the remaining spatial capacity and the remaining load capacity. In some embodiments, the overall capacities may be adjusted based on the user, e.g., based on user preference data, historical order data, and/or the user's physical characteristics (weight and/or height).

The smart shopping cart applies 550 a capacity-informed model to the obtained items and the remaining capacity to determine one or more recommended items. The capacity-informed model may identify candidate items from an item database that are not already obtained by the user. From the candidate items, the capacity-informed model may filter out items that are greater than the remaining capacity (e.g., either spatially too large and/or load-wise too heavy). From the filtered set of candidate items, the capacity-informed model may determine for each a likelihood that the user obtains the item. The capacity-informed model may input other contextual data in determining the likelihood, e.g., user preference data, historical order data, positioning data of the cart in relation to the items, etc. The capacity-informed model may also output a promotion to offer the user in conjunction with a recommended item.

The smart shopping cart displays 560, via an electronic display, the recommended items. The recommended items may be displayed together, or one at a time. The user may also swipe through the recommended items. Based on the user's acceptance or rejection of recommended items, the capacity-informed model may be fine-tuned. The smart shopping cart may also display navigation instructions and/or packing instructions for a recommended item.

Figure 6A:
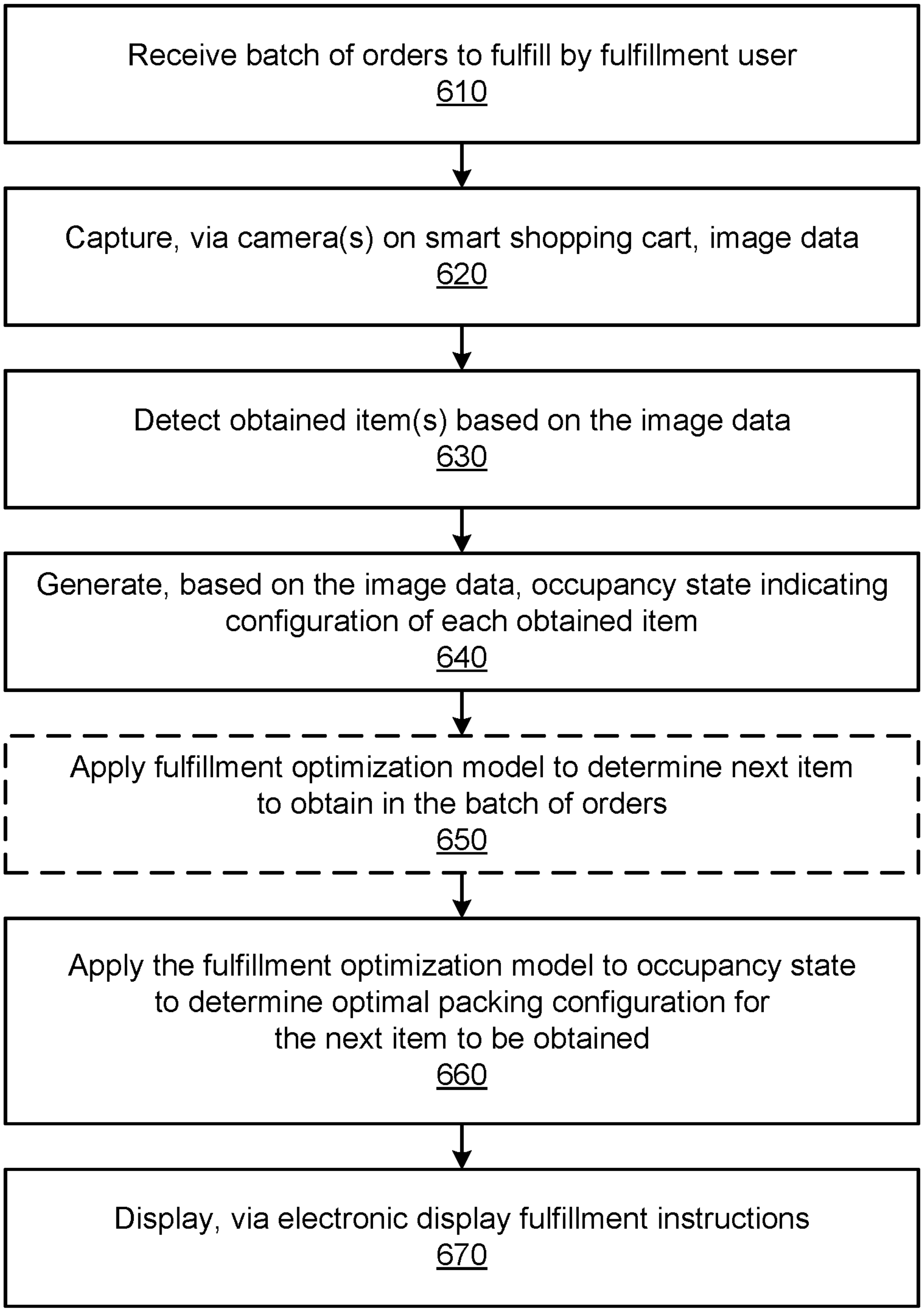
FIG. 6A is a flowchart describing the overall process of determining fulfillment instructions, in accordance with one or more embodiments.
Figure 6B:
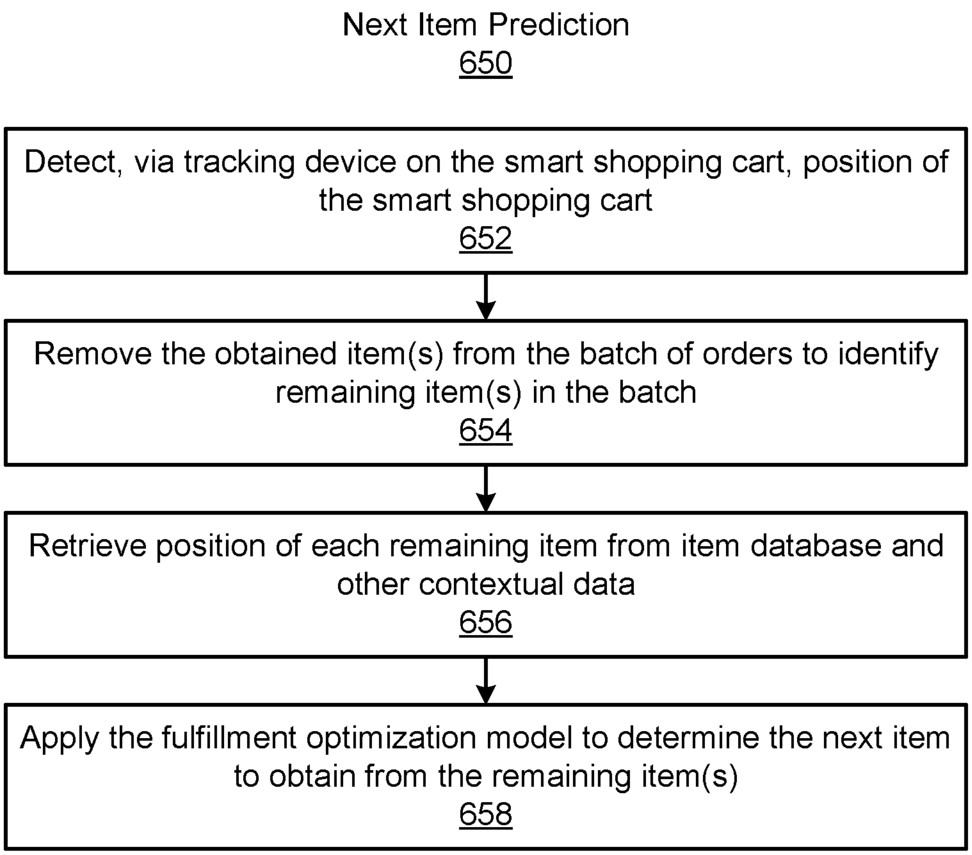
FIG. 6B is a flowchart describing the process of applying the fulfillment optimization model to determine the next item to obtain, in accordance with one or more embodiments.

FIGS. 6A & 6B relate to determining fulfillment instructions 600 in accordance with one or more embodiments. The description of FIGS. 6A & 6B is in the perspective of the smart shopping cart (e.g., the smart shopping cart 300), but in other embodiments, any computing system or device may perform any, some, or all of the steps.

In particular, FIG. 6A is a flowchart describing the overall process of determining fulfillment instructions 600, in accordance with one or more embodiments.

The smart shopping cart receives 610 a batch of orders to be fulfilled by a fulfillment user. The batch of orders may be provided by an online concierge system (e.g., the online concierge system 140). Each order may include a list of items to obtain in the retailer location.

The smart shopping cart captures 620, via one or more cameras, image data of one or more baskets of the smart shopping cart. In some embodiments, the cameras are disparately positioned to be in view of each basket. In other embodiments, some baskets are in view, and other baskets are not. The image data can include images and/or video. The image data may be timestamped.

The smart shopping cart can utilize other sensors to capture additional data. In one or more embodiments, load sensors can measure load data of the one or more baskets. The load data indicates load on the baskets over time. In other embodiments, the smart shopping cart may include a scanner that scans items that are placed into the baskets of the smart shopping cart. In yet another embodiments, the smart shopping cart may include a tracking device to track a current position of the smart shopping cart in the retailer location.

The smart shopping cart detects 630 obtained items based on the image data and, optionally, the other data captured by the other sensors. For example, the smart shopping cart may utilize an item detection model to classify images of an item to determine what item from the retailer was obtained. The item detection model may further classify based on the other data, e.g., load, item, scan data, or tracking data.

The smart shopping cart generates 640, based on the image data, an occupancy state indicating a configuration of each obtained item. The occupancy state may be a spatial representation of the physical configuration of each obtained item, which may include information on the position and/or the orientation of the obtained item. In some embodiments, the position of the obtained item refers to which of a plurality of containers the item is in. The occupancy state may further assign each of the containers to one of the orders in the batch.

In some embodiments, the smart shopping cart applies a fulfillment optimization model to determine a next item to obtain in the batch of orders. The smart shopping cart may determine the next item based on knowing the obtained items compared to the total list of items to be obtained in the batch of orders. The process of determining the next item is further described in FIG. 6B.

The smart shopping cart applies 660 the fulfillment optimization model to the occupancy state to determine an optimal packing configuration for the next item to be obtained. The fulfillment optimization model may determine the optimal packing configuration based on known dimensionality of the next item (and that of remaining items) in comparison to the current occupancy state. In some embodiments, the optimal packing configuration indicates a position and/or an orientation for the next item. In some embodiments, the position indicates one of a plurality of containers to place the next item (which may include instructions to start a new container).

In some embodiments, the fulfillment optimization model may determine other fulfillment instructions in conjunction with the optimal packing configuration. In one or more embodiments, the fulfillment instructions may include navigation instructions to navigate the user to the next item to obtain. The navigation instructions may be based on a current position of the smart shopping cart in relation to a position of the next item in the retailer location. In other embodiments, the fulfillment instructions may include remedial instructions to rearrange or to double check an obtained item. For example, the item obtained is not in the batch, or the item obtained is placed in the wrong container.

The smart shopping cart displays 670, via the electronic display, the fulfillment instructions. The electronic display may display the fulfillment instructions which may also include one or more animations to provide an improved user experience and/or engagement with the smart shopping cart.

FIG. 6B is a flowchart describing the process of applying 650 the fulfillment optimization model to determine the next item to obtain, in accordance with one or more embodiments.

The smart shopping cart detects 652, via a tracking device, a current position of the smart shopping cart. The tracking device may use various technologies to determine the position. The smart shopping cart may also collect other contextual data, e.g., provided by the online concierge system, or by the retailer computing system. Other contextual data may include user preference data, historical order data, traffic flow data, etc.

The smart shopping cart removes 654 the obtained one or more items from the batch of orders to identify remaining items in the batch.

The smart shopping cart retrieves 656 a position of each remaining item from an item database and/or other contextual data. Each position of the items may be uploaded into the item database, e.g., by the retailer computing system.

Other contextual data may include a user's physical characteristics, historical order data, etc.

The smart shopping cart applies 658 the fulfillment optimization model to the remaining items and the positioning data to determine the next item to obtain. For example, the fulfillment optimization model may utilize real-time traffic flow to guide the user to the remaining item that optimizes efficiency, e.g., avoiding delay time by trying to obtain an item in a crowded space.

In other embodiments, an item to be obtained is determined to be unable, thereby the smart shopping cart triggers a replacement workflow to determine a suitable alternative. The fulfillment optimization model may input the positioning data of the available alternatives to identify which of the alternatives to recommend to the user as a substitute item.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor may comprise one or more subprocessing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed by a computer system comprising a processor and a non-transitory computer-readable medium, comprising:

receiving a batch of orders to be fulfilled by a fulfillment user at a retailer location, wherein each order includes one or more items to be obtained;

capturing, via one or more cameras positioned facing at least a first basket of a smart shopping cart, image data;

detecting one or more obtained items placed in the first basket based on the image data;

generating, based on the image data, an occupancy state of the first basket indicating a spatial configuration of each obtained item in the first basket of the smart shopping cart;

applying a fulfillment optimization model to the occupancy state to identify a next item to be obtained in the batch of orders and an optimal packing configuration in the first basket to place the next item relative to the one or more obtained items in the first basket that maximizes packing of the first basket; and displaying, via an electronic display, the next item and the optimal packing configuration to place the next item in the first basket.

2. The method of claim 1, further comprising:

measuring, via a first load sensor coupled to the first basket of the smart shopping cart, load data indicating load over time on the first basket;

wherein applying the fulfillment optimization model to identify the optimal packing configuration comprises applying the fulfillment optimization model further to the load data.

3. The method of claim 1, wherein the fulfillment optimization model is trained by:

capturing, via the one or more cameras, additional image data in a subsequent time period;

detecting the next item is placed in the first basket in a non-optimal packing configuration that is different than the optimal packing configuration; and responsive to detecting the next item in the non-optimal packing configuration, displaying, via the electronic display, instructions to rearrange the next item to be in the optimal packing configuration.

4. The method of claim 1, wherein generating the occupancy state of the first basket comprises:

detecting, from the image data, a plurality of containers, each container in a different position from other containers in the first basket;

identifying, for each obtained item, one of the plurality of containers that the obtained item is placed in; and assigning each container to one order of the batch of orders based on the obtained items placed in the container.

5. The method of claim 4, wherein applying the fulfillment optimization model to identify the optimal packing configuration for the next item comprises:

identifying a particular order the next item is for;

identifying one or more of the containers assigned to the particular order; and applying the fulfillment optimization model to the one or more containers assigned to the particular order to identify a particular container as the optimal packing configuration for the next item.

6. The method of claim 1, wherein the optimal packing configuration identified by the fulfillment optimization model includes a particular position in the first basket and a particular orientation of the next item in the particular position.

7. The method of claim 1, wherein displaying the next item and the optimal packing configuration to place the next item in the first basket comprises displaying an animation of the next item being placed into the optimal packing configuration in the first basket.

8. The method of claim 1, wherein applying the fulfillment optimization model to identify the next item to be obtained in the batch of orders further comprises:

detecting, via a tracking device on the smart shopping cart, a current position of the smart shopping cart in the retailer location;

removing the one or more obtained items from the corresponding orders yielding remaining items to be obtained in the batch of orders;

retrieving a position in the retailer location for each remaining item; and applying the fulfillment optimization model to the current position of the smart shopping cart and to the positions of the remaining items to identify the next item to obtain.

9. The method of claim 8, wherein applying the fulfillment optimization model to identify the next item to be obtained in the batch of orders further comprises:

receiving a traffic flow at the retailer location indicating relative cart movement speed throughout the retailer location;

wherein applying the fulfillment optimization model to identify the next item further comprises applying the fulfillment optimization model further to the traffic flow.

10. The method of claim 8, wherein applying the fulfillment optimization model to identify the next item to be obtained in the batch of orders further comprises:

obtaining one or more characteristics of the fulfillment user including one or more of: a height of the fulfillment user, and a weight of the fulfillment user; and wherein applying the fulfillment optimization model to identify the next item further comprises applying the fulfillment optimization model further to the one or more characteristics of the fulfillment user.

11. The method of claim 8, wherein applying the fulfillment optimization model to identify the next item to be obtained in the batch of orders further comprises:

for each remaining item, applying the fulfillment optimization model to identify an efficiency score indicating a likelihood of optimizing fulfillment efficiency if the remaining item is selected as the next item;

ranking the remaining items based on the efficiency scores; and selecting the remaining item from the rank with a highest efficiency score as the next item.

12. The method of claim 8, wherein the fulfillment optimization model is trained by:

retrieving historical orders fulfilled by fulfillment users at the retailer location, wherein each of the historical orders includes image data captured by one or more cameras of the corresponding smart shopping cart and a sequence of items obtained in the historical order;

scoring the sequence of items obtained in the historical order based on a time of completion of the historical order; and training the fulfillment optimization model with the historical orders and the scores for the sequences of items obtained.

13. The method of claim 8, further comprising:

generating navigation instructions for the fulfillment user to navigate to the next item, wherein the navigation instructions are based on the current position of the smart shopping cart and the position of the next item; and displaying, via the electronic display, the navigation instructions in conjunction with the next item.

14. The method of claim 8, further comprising:

receiving a message from the fulfillment user that the next item is unavailable;

responsive to the message, identifying a list of substitute items that can be obtained in lieu of the next item that is unavailable;

retrieving a position in the retailer location for each substitute item;

applying the fulfillment optimization model to the current position of the smart shopping cart and the positions of the substitute items to identify one of the substitute items to obtain in lieu of the next item that is unavailable; and displaying, via the electronic display, the substitute item.

15. A non-transitory computer-readable medium storing instructions that, when executed by a computer processor, cause the computer processor to perform operations comprising:

receiving a batch of orders to be fulfilled by a fulfillment user at a retailer location, wherein each order includes one or more items to be obtained;

capturing, via one or more cameras positioned facing at least a first basket of a smart shopping cart, image data;

detecting one or more obtained items placed in the first basket based on the image data;

generating, based on the image data, an occupancy state of the first basket indicating a spatial configuration of each obtained item in the first basket of the smart shopping cart;

applying a fulfillment optimization model to the occupancy state to identify a next item to be obtained in the batch of orders and an optimal packing configuration in the first basket to place the next item relative to the one or more obtained items in the first basket that maximizes packing of the first basket; and displaying, via an electronic display, the next item and the optimal packing configuration to place the next item in the first basket.

16. The non-transitory computer-readable medium of claim 15, the operations further comprising:

measuring, via a first load sensor coupled to the first basket of the smart shopping cart, load data indicating load over time on the first basket;

wherein applying the fulfillment optimization model to identify the optimal packing configuration comprises applying the fulfillment optimization model further to the load data.

17. The non-transitory computer-readable medium of claim 15, wherein the fulfillment optimization model is trained by:

capturing, via the one or more cameras, additional image data in a subsequent time period;

detecting the next item is placed in the first basket in a non-optimal packing configuration that is different than the optimal packing configuration; and responsive to detecting the next item in the non-optimal packing configuration, displaying, via the electronic display, instructions to rearrange the next item to be in the optimal packing configuration.

18. The non-transitory computer-readable medium of claim 15, wherein applying the fulfillment optimization model to identify the next item to be obtained in the batch of orders further comprises:

detecting, via a tracking device on the smart shopping cart, a current position of the smart shopping cart in the retailer location;

removing the one or more obtained items from the corresponding orders yielding remaining items to be obtained in the batch of orders;

retrieving a position in the retailer location for each remaining item; and applying the fulfillment optimization model to the current position of the smart shopping cart and to the positions of the remaining items to identify the next item to obtain.

19. The non-transitory computer-readable medium of claim 18, wherein applying the fulfillment optimization model to identify the next item to be obtained in the batch of orders further comprises:

receiving a traffic flow at the retailer location indicating relative cart movement speed throughout the retailer location;

wherein applying the fulfillment optimization model to identify the next item further comprises applying the fulfillment optimization model further to the traffic flow.

20. The non-transitory computer-readable medium of claim 18, the operations further comprising:

generating navigation instructions for the fulfillment user to navigate to the next item, wherein the navigation instructions are based on the current position of the smart shopping cart and the position of the next item; and displaying, via the electronic display, the navigation instructions in conjunction with the next item.

* * * * *